United States Patent [19]
Wold

[11] 4,300,589
[45] Nov. 17, 1981

[54] AUTOMOBILE WHEEL CYLINDER LEAK DAMAGE PREVENTION

[76] Inventor: Duane V. Wold, 7178 Tranquility Dr., Sacramento, Calif. 95823

[21] Appl. No.: 80,244

[22] Filed: Oct. 1, 1979

[51] Int. Cl.³ .................................. F16K 23/00
[52] U.S. Cl. ............................. 137/312; 92/86
[58] Field of Search ......................... 137/312; 92/86

[56] References Cited
U.S. PATENT DOCUMENTS

| | | | |
|---|---|---|---|
| 137,200 | 3/1873 | Haskins | 92/86 |
| 2,728,195 | 12/1955 | Mills | 92/86 |
| 3,943,831 | 3/1976 | Coupland | 92/86 |
| 3,973,473 | 8/1976 | Bate | 92/86 |

Primary Examiner—A. Michael Chambers
Attorney, Agent, or Firm—Blair, Brown & Kreten

[57] ABSTRACT

A device for draining hydraulic brake fluid which leaks from the wheel cylinder of drum brakes in a hydraulic brake system for a motor vehicle which includes a catch basin disposed below the wheel cylinder on the drum brakes for collecting the leaking fluid with an exit tube connected to the bottom of the catch basin, the tube extending from the catch basin to the exterior of the drum brakes so that the leaking fluid is conducted from the catch basin through the tube and falls harmlessly on the ground thereby avoiding contamination of the surfaces of the brake shoes and drum.

2 Claims, 2 Drawing Figures

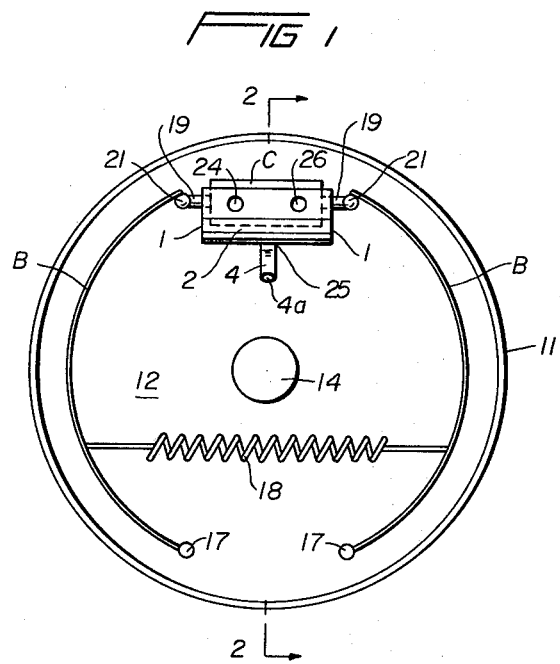
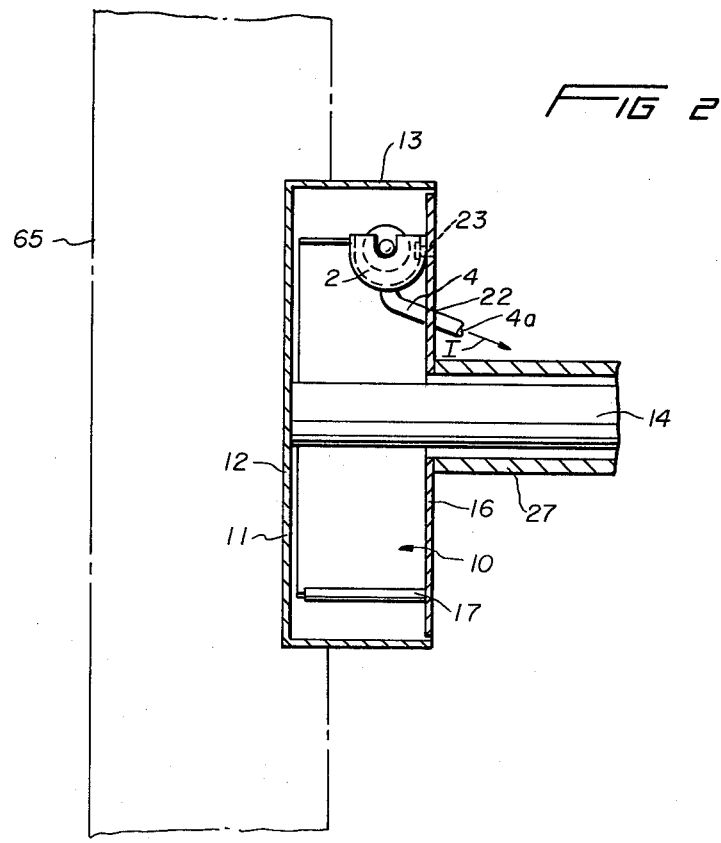

AUTOMOBILE WHEEL CYLINDER LEAK DAMAGE PREVENTION

BACKGROUND OF THE INVENTION

In a typical hydraulic brake system, the brake shoes contained in the brake drum of a conventional motor vehicle are actuated by hydraulic wheel cylinders contained therein. After years of repeated use, the seals in the hydraulic wheel cylinders wear and eventually permit the egress of brake fluid into the brake drum area. Leaking brake fluid will contaminate the surface of the brake shoes and drums reducing the efficiency of the entire braking system and creating a hazardous condition. However, if leaking brake fluid can be diverted outside the brake drum area, contamination of the brake shoes and drums will be prevented.

Our search did not uncover a reference teaching the use of a fluid leak diverter in combination with a brake. However, the following references may be germane to the patentability of the present invention:

U.S. Pat. No. 2,829,004 Roosa
U.S. Pat. No. 3,304,950 Hubert
U.S. Pat. No. 3,473,553 Collins All of the references cited involve the use of catch basins for containment of fluids but none is similar structurally or conceptually to the present invention.

SUMMARY AND OBJECTS OF THE INVENTION

Accordingly, it is a primary object of the present invention to provide an inexpensive and easily installed device that prevents the egress of brake fluid into the brake drum area which in turns leads to contamination of the brake shoes and an expensive brake job soon follows. This is accomplished in the present invention by providing a catch basin deployed beneath and surrounding the wheel cylinder.

It is a further object of the present invention to provide an exit chute for the brake fluid that accumulates in the catch basin, so that the brake fluid can be harmlessly discharged and not accumulate inside the brake drum area.

It is a further object of the present invention to increase the safety of conventional hydraulic brakes by preventing the contamination of the brake shoes and drums which often results in grabbing of brakes and uneven braking.

Other objects and advantages will become apparent in the following specification when considered in light of the attached drawings.

BRIEF DESCRIPTION OF THE DRAWINGS

FIG. 1 is a side view of the interior of a brake drum with the present device installed beneath the wheel cylinder; and FIG. 2 is a sectional perspective view of the brake drum.

DESCRIPTION OF THE PREFERRED EMBODIMENT

Referring now to the drawing in detail wherein like reference characters indicate like parts throughout the several figures, the reference numeral 10 refers generally to the interior area of a brake drum 11 having a front plate 12 and a side wall 13, the inner surface of which forms a braking surface. As is well known, the drum 11 is arranged for rotation on an axle 14 adjacent the wheel 65 of a motor vehicle. A stationary back plate 16 is mounted on a housing 17 through which the wheel axle 14 extends and the back plate 16 is disposed adjacent the rear of the drum 11 with its periphery in spaced-apart relationship with the drum side wall 13.

The letter B indicates the brake shoes which are pivotally supported within the drum interior 10 at pivot points 17. As is well known, the brake shoes B are yieldingly urged together by means of a spring 18. The letter C indicates a hydraulic wheel cylinder provided with pistons 19 having seals which are arranged to move outwardly in opposite directions against the upper ends 21 of the shoes B.

Reference numeral 2 refers to a catch basin which includes a body of arcuate cross-sectional shape in the form of a trough and which is disposed beneath and partially surrounds the wheel cylinder C as shown in FIG. 2. The ends of the catch basin 2 are closed by parallel end walls 1 formed to match the contour of the catch basin 2 and provided with openings for accommodating the pistons 14.

An opening 21 is provided in the bottom of the catch basin 2 to which an exit tube 4 is connected. The exit tube 4 extends through an opening 22 provided in the drum back plate 16, and terminates in an outlet end 4a exteriorly of the drum interior 10. Thus, brake fluid which leaks out of the cylinder C around the pistons 18 flows downwardly into the catch basin 2 and through the exit tube 4 out of the outlet end 4a to be discharged in the direction of the arrow I harmlessly onto the ground. The catch basin 2 and the wheel cylinder C are mounted on the back plate 16 by any suitable means such as bolts 23 which extends through openings 24, 26 provided in an uppermost edge portion of the basin 2 and the back plate 16 respectively.

Having thus described the preferred embodiment of the invention it should be understood that numerous structural modifications and adaptations may be resorted to without departing from the spirit of the invention.

What is claimed is:

1. A device for draining leaking brake fluid from the interior of a brake drum in hydraulic brake system for a motor vehicle having brake shoes and a wheel cylinder for actuating said brake shoes comprising, in combination, a catch basin disposed in underlying relationship with said wheel cylinder for collecting said brake fluid leaking from said cylinder, means for supporting said catch basin in said underlying relationship with said cylinder and an exit tube connected to the bottom of said catch basin, said exit tube having an outlet end disposed exteriorly of said brake drum interior for discharging the brake fluid collected in said catch basin to the exterior of said drum thereby avoiding contamination to said brake shoes and drum and wherein said wheel cylinder is of a cylindrical configuration and wherein said catch basin comprises a body of arcuate cross-sectional shape having end walls at each end so as to partially surround said wheel cylinder.

2. A device in accordance with claim 1 wherein said brake drum is provided with a front plate and including a stationary back plate provided with an opening and wherein said exit tube extends from said catch basin through said back plate opening with said tube outlet end disposed on the opposite side of said back plate from said drum interior.

* * * * *